US012615527B2

(12) United States Patent
Wen et al.

(10) Patent No.: US 12,615,527 B2
(45) Date of Patent: Apr. 28, 2026

(54) METHOD AND DEVICE FOR SETTING NETWORK MODE OF ELECTRONIC TERMINAL

(71) Applicant: Samsung Electronics Co., Ltd., Suwon-si (KR)

(72) Inventors: Hancheng Wen, Guangzhou (CN); Jianbin Qin, Guangzhou (CN); Min Li, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 18/185,874

(22) Filed: Mar. 17, 2023

(65) Prior Publication Data

US 2023/0224742 A1    Jul. 13, 2023

Related U.S. Application Data

(63) Continuation of application No. PCT/KR2022/006116, filed on Apr. 28, 2022.

(30) Foreign Application Priority Data

May 8, 2021    (CN) .......................... 202110501893.8

(51) Int. Cl.
    *H04W 24/08*        (2009.01)
    *H04W 76/20*        (2018.01)
(52) U.S. Cl.
    CPC ........... *H04W 24/08* (2013.01); *H04W 76/20* (2018.02)

(58) Field of Classification Search
    CPC .............................. H04W 24/08; H04W 76/20
    See application file for complete search history.

(56) References Cited

U.S. PATENT DOCUMENTS

| | | | |
|---|---|---|---|
| 10,911,993 B2 | 2/2021 | Pakniat et al. | |
| 2010/0151864 A1* | 6/2010 | Mori ..................... | H04W 48/20 455/450 |
| 2016/0057661 A1* | 2/2016 | Nayak ................... | H04W 8/183 370/331 |
| 2016/0360435 A1 | 12/2016 | Arzelier et al. | |
| 2017/0311374 A1 | 10/2017 | Chang et al. | |

(Continued)

FOREIGN PATENT DOCUMENTS

| | | |
|---|---|---|
| CN | 112714407 A | 4/2021 |
| CN | 112738717 A | 4/2021 |

(Continued)

OTHER PUBLICATIONS

Extended European Search Report dated Oct. 15, 2024; European Appln. No. 22807673.3-1215 / 4335235 PCT/KR2022006116.

(Continued)

*Primary Examiner* — Brian P Cox
(74) *Attorney, Agent, or Firm* — Jefferson IP Law, LLP

(57)        ABSTRACT

A method and a device for setting a network mode of an electronic terminal are provided. The method includes monitoring whether a mobile communication network area where the electronic terminal is located has been changed, acquiring network status information of a current network area, in response to the mobile communication network area being changed, and setting the network mode based on the network status information of the current network area.

9 Claims, 5 Drawing Sheets

(56)                          References Cited

U.S. PATENT DOCUMENTS

| 2019/0028873 | A1* | 1/2019 | Drevon | H04L 61/4511 |
|---|---|---|---|---|
| 2019/0306863 | A1 | 10/2019 | Tang | |
| 2019/0349749 | A1* | 11/2019 | Peng | H04W 60/04 |
| 2020/0045590 | A1 | 2/2020 | Wu | |
| 2021/0120468 | A1 | 4/2021 | Stauffer et al. | |
| 2021/0282077 | A1* | 9/2021 | Wei | H04W 48/18 |

FOREIGN PATENT DOCUMENTS

| EP | 3 793 264 A1 | 3/2021 |
|---|---|---|
| KR | 10-2009-0122790 A | 12/2009 |
| KR | 10-2021-0014693 A | 2/2021 |
| KR | 10-2021-0020267 A | 2/2021 |
| KR | 10-2232679 B1 | 3/2021 |
| WO | 2019/139088 A1 | 7/2019 |
| WO | 2020/033693 A1 | 2/2020 |
| WO | 2020/197843 A1 | 10/2020 |
| WO | 2020/228011 A1 | 11/2020 |

OTHER PUBLICATIONS

International Search Report dated Aug. 10, 2022, issued in International Application No. PCT/KR2022/006116.

* cited by examiner

Monitoring whether a mobile communiication network area where the electronic terminal is located has been changed(S10)

Acquiring network status information of a current network area, in response to the network area being changed(S20)

Setting the network mode based on the network status information of the current network area(S30)

TAC1
SA : OK

TAC2
SA : Not Ok

TAC3
SA : Ok

Local list

| TAC information | SA status information |
|---|---|
| TAC1 | OK |
| TAC2 | Not OK |
| TAC3 | OK |

METHOD AND DEVICE FOR SETTING NETWORK MODE OF ELECTRONIC TERMINAL

CROSS-REFERENCE TO RELATED APPLICATION(S)

This application is a continuation application, claiming priority under § 365(c), of an International application No. PCT/KR2022/006116, filed on Apr. 28, 2022, which is based on and claims the benefit of a Chinese patent application number 202110501893.8, filed on May 8, 2021, in the Chinese Intellectual Property Office, the disclosure of which is incorporated by reference herein in its entirety.

TECHNICAL FIELD

The disclosure relates to the field of communication technology. More particularly, the disclosure relates to a method and device for setting a network mode of an electronic terminal.

BACKGROUND 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In the early stage of $5^{th}$ generation (5G) network development, there may be many problems (for example, disconnected networks, dropped calls, etc.) due to imperfection and instability of standalone (SA) networks. For example, in the suburbs of city A, a layout of 5G SA network base stations are imperfect, and thus base stations that support SA and non-standalone (NSA) at the same time, and base stations that only support NSA may alternately exist. When a 5G electronic terminal (for example, mobile phone) of a user is set to an SA+NSA mode (that is, priority access to an SA mode) and is active in the suburbs, it may frequently switch to access SA and NSA networks (network switching between SA and NSA is controlled by the network, mainly determined by thresholds such as a signal strength or a signal quality), and various problems such as dropped calls, disconnected networks, or increased power consumption may occur during network switching. Or, the 5G SA network itself may be unstable in a certain area. Even if the electronic terminal of the user is always set to the SA mode, problems such as dropped calls or disconnected networks may still occur.

Therefore, a better method is, in areas where the 5G SA network is imperfect or unstable, setting the 5G electronic terminal of the user to an NSA network mode, that is, turning on a 5G SA function accurately according to different areas to avoid problems caused by the network switching between SA and NSA and the instability of the SA network itself.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for setting a network mode of an electronic terminal, which can effectively set the network mode of the electronic terminal.

Additional aspects will be set forth in part in the description which follows and, in part, will be apparent from the description, or may be learned by practice of the presented embodiments.

In accordance with an aspect of the disclosure, a method for setting a network mode of an electronic terminal is provided. The method includes monitoring whether a mobile communication network area where the electronic terminal is located has been changed, acquiring network status information of a current network area, in response to the mobile communication network area being changed, and setting the network mode based on the network status information of the current network area.

Optionally, the network status information of the network area includes information regarding whether a specific network mode is available in the network area.

Optionally, the operation of setting the network mode based on the network status information of the current network area, includes setting the network mode to turn on a specific network mode, when the specific network mode is available in the current network area, and setting the network mode to turn off the specific network mode, when the specific network mode is not available in the current network area.

Optionally, the operation of monitoring whether a mobile communication network area where the electronic terminal is located has been changed, includes acquiring identification information of the current network area, determining whether or not the identification information of the current network area is same as identification information of a network area acquired a previous time, and if not, determining that the network area where the electronic terminal is located has been changed.

Optionally, the operation of acquiring identification information of the current network area, includes acquiring the identification information of the current network area according to a registered cell, or, acquiring the identification information of the current network area by positioning.

Optionally, the network area is a tracking area.

Optionally, the specific network mode is a standalone SA mode, where, the operation of setting the network mode based on the network status information of the current network area, includes setting the network mode to an SA priority mode, when the SA mode is available in the current network area, and setting the network mode to a nonstandalone NSA mode, when the SA mode is not available in the current network area.

Optionally, the operation of acquiring network status information of a current network area, includes querying the network status information of the current network area from a local list, where, identification information of the network area and the network status information of the network area are recorded in association in the list.

Optionally, the operation of acquiring network status information of a current network area, further includes sending the identification information of the current network area to a server, and receiving the network status information of the current network area from the server, when the network status information of the current network area is not found from the list.

Optionally, the method further includes recording the identification information of the current network area and the network status information of the current network area in the list in association, when receiving the network status information of the current network area from the server.

Optionally, the method further includes deleting all or part of entries in the list, when a preset condition is met, or, acquiring periodically the network status information of the network area from the server to update the list.

In accordance with another aspect of the disclosure, a device for setting a network mode of an electronic terminal is provided. The device includes a memory, and at least one processor configured to monitor whether a mobile communication network area where the electronic terminal is located has been changed, acquire network status information of a current network area, in response to the mobile communication network area being changed, and set the network mode based on the network status information of the current network area.

Optionally, the network status information of the network area includes information regarding whether a specific network mode is available in the network area.

Optionally, the at least one processor is configured to set the network mode to turn on a specific network mode, when the specific network mode is available in the current network area, and set the network mode to turn off the specific network mode, when the specific network mode is not available in the current network area.

Optionally, the at least one processor is configured to acquire identification information of the current network area, determine whether or not the identification information of the current network area is same as identification information of a network area acquired a previous time, and if not, determine that the network area where the electronic terminal is located has been changed.

Optionally, the at least one processor is configured to acquire the identification information of the current network area according to a registered cell, or, acquire the identification information of the current network area by positioning.

Optionally, the network area is a tracking area.

Optionally, the specific network mode is a standalone SA mode, where the at least one processor is configured to set the network mode to an SA priority mode, when the SA mode is available in the current network area, and set the network mode to a non-standalone NSA mode, when the SA mode is not available in the current network area.

Optionally, the at least one processor is configured to query the network status information of the current network area from a local list, where, identification information of the network area and the network status information of the network area are recorded in association in the list.

Optionally, the at least one processor is configured to send the identification information of the current network area to a server, and receive the network status information of the current network area from the server, when the network status information of the current network area is not found from the list.

Optionally, the device further includes: a status information recording unit, configured to record the identification information of the current network area and the network status information of the current network area in the list in association, when receiving the network status information of the current network area from the server.

Optionally, the device further includes a list updating unit, configured to delete all or part of entries in the list, when a preset condition is met, or, acquire periodically the network status information of the network area from the server to update the list.

In accordance with another aspect of the disclosure, a computer readable storage medium storing computer programs is provided. The computer programs, when executed by a processor, implement the method for setting a network mode of an electronic terminal as described above.

In accordance with another aspect of the disclosure, an electronic terminal is provided. The electronic terminal includes a processor, and a memory, storing a computer program, the computer program, when executed by the processor, implements the method for setting a network mode of an electronic terminal as described above.

The method and device for setting a network mode of an electronic terminal according to the various embodiments of the disclosure, can keep the mobile network of the electronic terminal stable continuously, avoiding problems such as dropped calls or disconnected networks, and avoiding an impact of network instability caused by imperfection or instability of a specific network (for example, SA network) on the electronic terminal, improving user experience, in addition, can acquire the network status information of the network area locally, avoiding frequent data interaction with the server in order to acquire the network status information of the network area, thereby saving power and data traffic.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
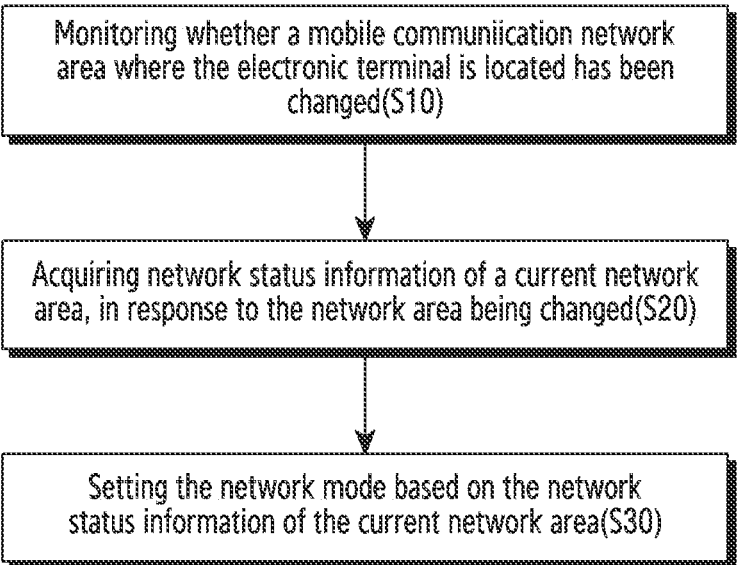
FIG. 1 shows a flowchart of a method for setting a network mode of an electronic terminal according to an embodiment of the disclosure.

FIG. 1 shows a flowchart of a method for setting a network mode of an electronic terminal according to an embodiment of the disclosure. The method may be implemented by a computer program. For example, the method may be performed by an application installed in the electronic terminal, or performed by a functional program implemented in an operating system of the electronic terminal. As an example, the electronic terminal may be an electronic terminal such as a mobile communication terminal (for example, a smart phone), a smart wearable device (for example, a smart watch), or a tablet computer.

Referring to FIG. 1, in operation S10, monitoring whether a mobile communication network area where the electronic terminal is located has been changed.

As an example, the network area may be a tracking area (TA). It should be understood that the network area may also be other types of areas for mobile communication.

As an example, identification information of the current network area may be acquired; then, it is determined whether or not the identification information of the current network area is same as identification information of a network area acquired the previous time; and if not, it may be determined that the network area where the electronic terminal is located has been changed.

As an example, when the network area is a tracking area TA, the identification information of the network area may be a tracking area code (TAC).

As an example, it may monitor whether a network service state changes; and when a change in the network service state is monitored, it may trigger to acquire the identification information of the current network area. For example, a Radio Layer Interface (RIL) module may be used to monitor whether the service state changes. For example, it may monitor whether a network signal strength and/or a registered cell changes; and when a change is monitored, it may trigger to acquire the identification information of the current network area.

As an example, the identification information of the current network area may be acquired according to the registered cell. For example, one network area may cover at least one registered cell, and a network area to which the current registered cell belongs may be used as the current network area.

As another example, the identification information of the current network area may be acquired by positioning. For example, the TAC may be obtained by calling requestCellInfoUpdate API of TelephonyManager, and using getCellIdentity( ) API in CellInfo called back by onCellInfo. Here, the requestCellInfoUpdate API requires a user to turn on a positioning service. If the positioning service of the user is turned off, the TAC cannot be obtained in this method.

In operation S20, acquiring network status information of a current network area, in response to the network area being changed.

As an example, the network status information of the network area may include: information regarding whether a specific network mode is available in the network area. Whether a specific network mode is available in the network area, may be understood as: whether the electronic terminal supports use of the specific network mode when the electronic terminal is located in the network area. For example, the specific network mode may be a standalone SA mode, and the network status information of the network area may include: whether the SA mode is available in the TA.

As an example, the network status information of the current network area may be queried from a local list.

Here, the identification information of the network area and the network status information of the network area are recorded in association in the list. For example, TAC: 9275 and SA Status: Ok (i.e., the SA mode is available) may be recorded as one entry in the list; and TAC: 9225 and SA Status: Not Ok (i.e., the SA mode is not available) may be recorded as another entry in the list.

As an example, when the network status information of the current network area cannot be found from the list, the identification information of the current network area may be sent to a server, and the network status information of the current network area may be received from the server.

As an example, the server may be a server of an Equipment Configuration System (ECS) platform (ECS platform: China Mobile Intelligent Terminal Capability Configuration Platform).

In operation S30, setting the network mode based on the network status information of the current network area.

As an example, when the specific network mode is available in the current network area, the network mode may be set to turn on the specific network mode or the specific network mode is prioritized; and when the specific network mode is not available in the current network area, the network mode is set to turn off the specific network mode.

As an example, when the specific network mode is standalone SA mode, when the SA mode is available in the current network area, the network mode may be set to an SA priority mode; and when the SA mode is not available in the current network area, the network mode may be set to a non-standalone NSA mode. For example, the SA priority mode is an SA+NSA mode, and may give priority to access to an SA network; in the NSA mode, it may only access an NSA network, not the SA network.

In addition, as an example, the method for setting a network mode of an electronic terminal according to an embodiment of the disclosure may further include: recording the identification information of the current network area and the network status information of the current network area in the list in association, when receiving the network status information of the current network area from the server.

As an example, the method for setting a network mode of an electronic terminal according to an embodiment of the disclosure may further include: updating the list to ensure an accuracy of configuration information in the list.

As an example, when a preset condition is met, all or part of entries in the list may be deleted, so that the list can record the latest configuration information. For example, the preset condition may include: a total number of entries in the list exceeds a preset threshold, or a time point since a previous deletion of an entry in the list reaches a preset duration.

As another example, the network status information of the network area may be acquired periodically from the server to update the list.

Figure 2:
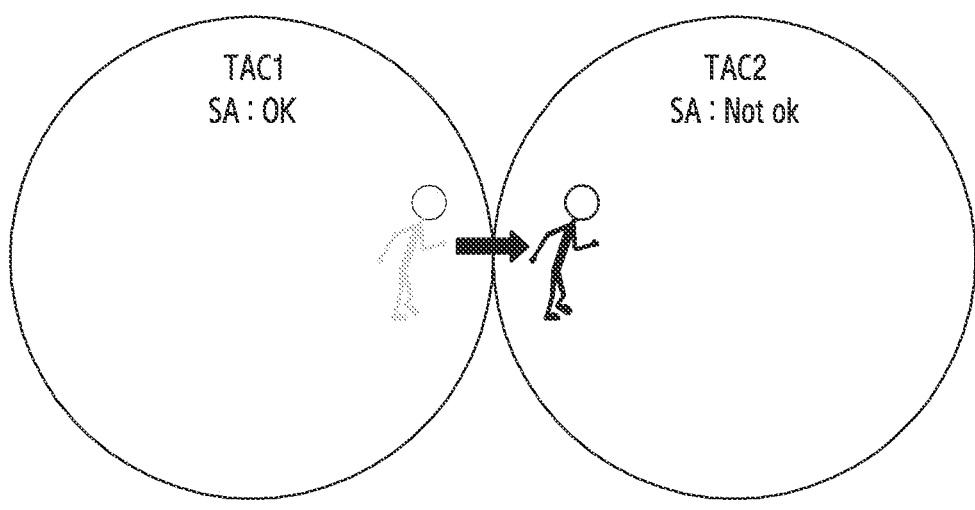
FIG. 2 shows an application example of the method for setting a network mode of an electronic terminal according to an embodiment of the disclosure.

FIG. 2 shows an application example of the method for setting a network mode of an electronic terminal according to an embodiment of the disclosure.

Using the network area as a TA, the identification information of the network area as a TAC, and the specific network mode as the SA mode as an example, referring to FIG. 2, the disclosure considers that the following situation may occur: if the TAC is acquired in a reporting period timing method (for example, every 10 minutes), for example, in this period (for example, the 0th minute), triggering to acquire a TAC1 of a current TA1, reporting the TAC1 to an ECS platform server, and receiving an available configuration parameter of the SA mode issued by the platform server (i.e., SA Status: Ok), then setting the network mode to the SA priority mode based on the received configuration parameter, and setting the network in the SA. If the electronic terminal moves from the TA1 to a TA2 before triggering to acquire the TAC (for example, the Pt minute) in a next period (for example, the 10th minute), the electronic terminal cannot report a TAC2 of the TA2 where it is currently actually located in time to acquire information that is unavailable to the SA mode of the TA2, which may cause short-term network instability. This is because the electronic terminal is still in the SA priority mode before a period timer is triggered, that is, in the first to tenth minutes. As the SA network in the TA2 area is unstable or imperfect, the network of the electronic terminal may be unstable or even disconnected.

The embodiment of the disclosure proposes to always monitor whether the TA where the electronic terminal is located is changed from one to another, that is, always monitor TA switching. When the TA is switched, it immediately triggers to acquire whether the SA mode of the current TA is available, and the network mode is set based on whether the SA mode of the current TA is available. That is, according to the embodiment of the disclosure, when the electronic terminal moves from the TA1 to the TA2, the flow of resetting the network mode can be triggered immediately.

Figure 3:
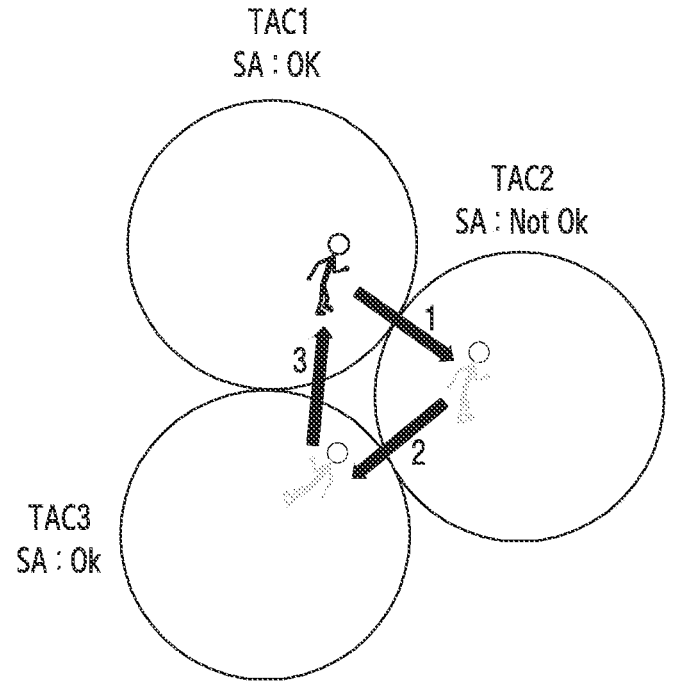
FIG. 3 shows another application example of the method for setting a network mode of an electronic terminal according to an embodiment of the disclosure.

FIG. 3 shows another application example of the method for setting a network mode of an electronic terminal according to an embodiment of the disclosure.

Using the network area as a TA, the identification information of the network area as a TAC, and the specific network mode as the SA mode as an example, referring to FIG. 3, the disclosure considers that the following situation may occur: if the electronic terminal frequently moves back and forth between several TAs (for example, the electronic terminal is in a TA1 in a first reporting period, moves to a TA2 in a second reporting period, moves to the TA1 again in a third reporting period, and so on), then the electronic terminal may report repeatedly for one or some TAs within one day to acquire whether the SA mode is available in the TA. This requires the electronic terminal to frequently report the TAC to an ECS platform server and receive configuration information (that is, whether the SA mode is available in the TA), which may lead to an increase in power consumption and data traffic.

The embodiment of the disclosure proposes that a list of the identification information of the network area and the network status information of the network area recorded in association may be stored in the terminal locally, so that before reporting the TAC to the server, first the network status information of the current network area may be queried from the local list. If it is found, the information may be used directly. If it is not found, the TAC may be reported to the ECS platform server, and the current TAC and the configuration information may be saved in association in the list after the ECS platform server issues the configuration information.

Referring to FIG. 3, when the electronic terminal frequently moves back and forth between several TAs, the flow of reporting the TAC to the ECS platform server may not be triggered. For example, if the electronic terminal passes the TA2 once, when the electronic terminal enters the TA2 from the TA1 again, TA switching occurs. The local list is queried, and if it is found that there is configuration information of a TAC2, without triggering to report the TAC2 to the ECS platform server, and the network mode is directly set to the NSA mode based on the locally stored configuration information (SA Status: Not Ok). When the electronic terminal enters a TA3 from the TA2 (never passes the TA3 before), TA switching occurs. Since the local list does not have configuration information of a TAC3, it triggers to report the TAC3 to the ECS platform server and set the network mode to the SA priority mode after receiving configuration information of SA OK issued by the ESC platform server, and save the configuration information to the list. When the electronic terminal enters the TA1 from the TA3, TA switching occurs. Since the local list caches configuration information of the TA1, it does not trigger to report a TAC1 to the ECS platform server, and the locally stored configuration information (SA Status: Ok) is directly acquired.

Figure 4:
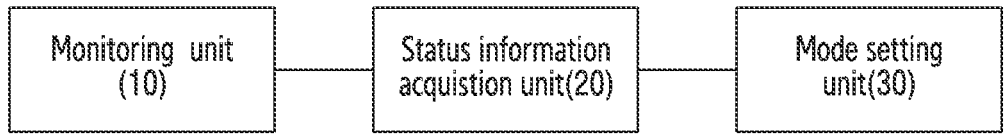
FIG. 4 shows a structural block diagram of a device for setting a network mode of an electronic terminal according to an embodiment of the disclosure.

FIG. 4 shows a structural block diagram of a device for setting a network mode of an electronic terminal according to an embodiment of the disclosure.

Referring to FIG. 4, the device for setting a network mode of an electronic terminal according to an embodiment of the disclosure includes: a monitoring unit 10, a status information acquisition unit 20, and a mode setting unit 30.

Specifically, the monitoring unit 10 is configured to monitor whether a mobile communication network area where the electronic terminal is located has been changed.

The status information acquisition unit 20 is configured to acquire network status information of a current network area, in response to the network area being changed.

The mode setting unit 30 is configured to set the network mode based on the network status information of the current network area.

As an example, the network status information of the network area may include: information regarding whether a specific network mode is available in the network area.

As an example, the mode setting unit 30 may be configured to set the network mode to turn on a specific network mode, when the specific network mode is available in the current network area; and set the network mode to turn off the specific network mode, when the specific network mode is not available in the current network area.

As an example, the monitoring unit 10 may be configured to acquire identification information of the current network area; determine whether or not the identification information of the current network area is same as identification information of a network area acquired a previous time; and if not, determine that the network area where the electronic terminal is located has been changed.

As an example, the monitoring unit 10 may be configured to acquire the identification information of the current network area according to a registered cell; or, acquire the identification information of the current network area by positioning.

As an example, the network area may be a tracking area.

As an example, the specific network mode may be a standalone SA mode, where the mode setting unit 30 may be configured to set the network mode to an SA priority mode, when the SA mode is available in the current network area; and set the network mode to a non-standalone NSA mode, when the SA mode is not available in the current network area.

As an example, the status information acquisition unit 20 may be configured to query the network status information of the current network area from a local list, where, identification information of the network area and the network status information of the network area are recorded in association in the list.

As an example, the status information acquisition unit 20 may be configured to send the identification information of the current network area to a server, and receive the network status information of the current network area from the server, when the network status information of the current network area is not found from the list.

As an example, the device for setting a network mode of an electronic terminal according to an embodiment of the disclosure may further include: a status information recording unit (not shown), configured to record the identification information of the current network area and the network status information of the current network area in the list in association, when receiving the network status information of the current network area from the server.

As an example, the device for setting a network mode of an electronic terminal according to an embodiment of the disclosure may further include: a list updating unit (not shown), configured to delete all or part of entries in the list, when a preset condition is met; or, acquire periodically the network status information of the network area from the server to update the list.

Figure 5:
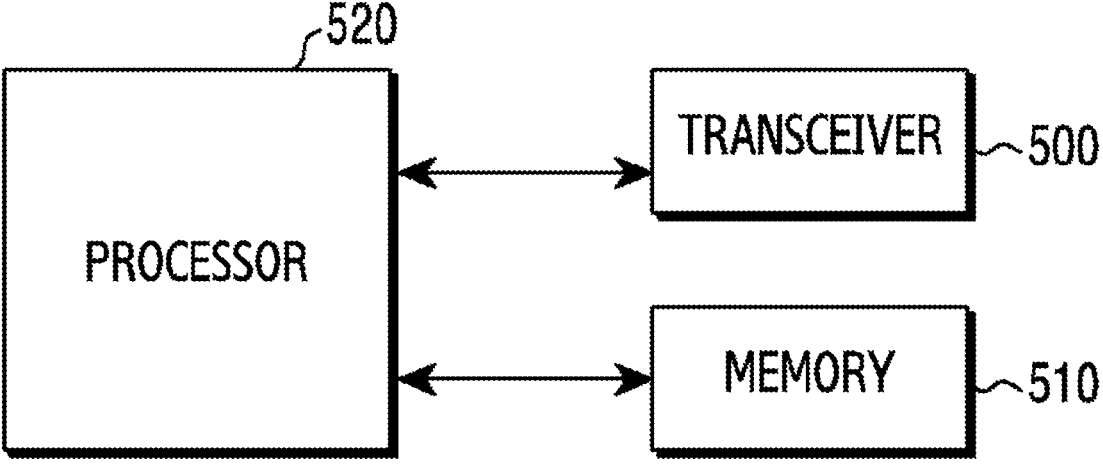
FIG. 5 shows a structure of a UE according to an embodiment of the disclosure.

FIG. 5 shows a structure of a UE according to an embodiment of the disclosure.

As shown in FIG. 5, the UE according to an embodiment may include a transceiver 510, a memory 520, and a processor 530. The transceiver 510, the memory 520, and the processor 530 of the UE may operate according to a communication method of the UE described above. However, the components of the UE are not limited thereto. For example, the UE may include more or fewer components than those described above. In addition, the processor 530, the transceiver 510, and the memory 520 may be implemented as a single chip. Also, the processor 530 may include at least one processor.

The transceiver 510 collectively refers to a UE receiver and a UE transmitter, and may transmit/receive a signal to/from a base station or a network entity. The signal transmitted or received to or from the base station or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

Also, the transceiver 510 may receive and output, to the processor 530, a signal through a wireless channel, and transmit a signal output from the processor 530 through the wireless channel.

The memory 520 may store a program and data required for operations of the UE. Also, the memory 520 may store control information or data included in a signal obtained by the UE. The memory 520 may be a storage medium, such as read-only memory (ROM), random access memory (RAM), a hard disk, a CD-ROM, and a DVD, or a combination of storage media.

The processor 530 may control a series of processes such that the UE operates as described above. For example, the transceiver 510 may receive a data signal including a control signal transmitted by the base station or the network entity, and the processor 530 may determine a result of receiving the control signal and the data signal transmitted by the base station or the network entity.

According to various embodiments, a method performed by a device for setting a network mode of an electronic terminal, the method comprising: monitoring whether a mobile communication network area where the electronic terminal is located has been changed; acquiring network status information of a current network area, in response to the mobile communication network area being changed; and setting the network mode based on the network status information of the current network area.

In one embodiment, wherein the network status information of the mobile communication network area comprises information regarding whether a specific network mode is available in the mobile communication network area.

In one embodiment, wherein the setting of the network mode based on the network status information of the current network area comprises: setting the network mode to turn on a specific network mode, when the specific network mode is available in the current network area; and setting the network mode to turn off the specific network mode, when the specific network mode is not available in the current network area.

In one embodiment, wherein the monitoring of whether a mobile communication network area where the electronic terminal is located has been changed comprises: acquiring identification information of the current network area; determining whether or not the identification information of the current network area is same as identification information of a network area acquired at a previous time; and in case that the identification information is not the same, determining that the network area where the electronic terminal is located has been changed.

In one embodiment, wherein the acquiring of the identification information of the current network area comprises: acquiring the identification information of the current network area according to a registered cell; or acquiring the identification information of the current network area by positioning.

In one embodiment, wherein the mobile communication network area is a tracking area.

In one embodiment, wherein the specific network mode is a standalone (SA) mode, and wherein the setting of the network mode based on the network status information of the current network area further comprises: setting the network mode to an SA priority mode, when the SA mode is available in the current network area, and setting the network mode to a non-standalone (NSA) mode, when the SA mode is not available in the current network area.

In one embodiment, wherein the acquiring of the network status information of a current network area comprises querying the network status information of the current network area from a local list, and wherein identification information of the mobile communication network area and the network status information of the mobile communication network area are recorded in association in the local list.

In one embodiment, wherein the acquiring of the network status information of a current network area further comprises: sending the identification information of the current network area to a server; and receiving the network status information of the current network area from the server, when the network status information of the current network area is not found from the local list.

In one embodiment, the method further comprising: recording the identification information of the current network area and the network status information of the current network area in the local list in association, when receiving the network status information of the current network area from the server.

In one embodiment, the method further comprising: deleting all or part of entries in the local list, when a preset condition is met; or acquiring periodically the network status information of the mobile communication network area from the server to update the local list.

According to various embodiments, a device for setting a network mode of an electronic terminal, the device comprising: a memory; and at least one processor configured to: monitor whether a mobile communication network area where the electronic terminal is located has been changed, acquire network status information of a current network area, in response to the mobile communication network area being changed, and set the network mode based on the network status information of the current network area.

In one embodiment, wherein the network status information of the mobile communication network area comprises information regarding whether a specific network mode is available in the mobile communication network area.

In one embodiment, wherein the at least one processor is further configured to: set the network mode to turn on a specific network mode, when the specific network mode is available in the current network area; and set the network mode to turn off the specific network mode, when the specific network mode is not available in the current network area.

In one embodiment, wherein the at least one processor is further configured to: acquire identification information of the current network area; determine whether or not the identification information of the current network area is same as identification information of a network area acquired a previous time; and in case that the identification information is not the same, determine that the network area where the electronic terminal is located has been changed.

In one embodiment, wherein the at least one processor is further configured to: acquire the identification information of the current network area according to a registered cell; or acquire the identification information of the current network area by positioning.

In one embodiment, wherein the mobile communication network area is a tracking area.

In one embodiment, wherein the specific network mode is a standalone (SA) mode, wherein the at least one processor is further configured to: set the network mode to an SA priority mode, when the SA mode is available in the current network area, and set the network mode to a non-standalone (NSA) mode, when the SA mode is not available in the current network area.

In one embodiment, wherein the at least one processor is further configured to query the network status information of the current network area from a local list, and wherein identification information of the mobile communication network area and the network status information of the mobile communication network area are recorded in association in the local list.

In one embodiment, wherein the at least one processor is further configured to: send the identification information of the current network area to a server; and receive the network status information of the current network area from the server, when the network status information of the current network area is not found from the local list.

In one embodiment, wherein the identification information of the current network area is a tracking area code (TAC) when a positioning service is turned on.

In one embodiment, wherein the SA priority mode supports the SA plus NSA mode with priority given to an SA network.

In one embodiment, wherein the NSA mode supports access to only an NSA network.

It should be understood that the specific processing performed by the device for setting a network mode of an electronic terminal according to an embodiment of the disclosure has been described in detail with reference to FIGS. 1 to 5, and detailed description thereof will be omitted.

In addition, it should be understood that the units in the device for setting a network mode of an electronic terminal according to an embodiment of the disclosure may be implemented as hardware components and/or software components. Those skilled in the art may implement the units, for example, by using a field programmable gate array (FPGA) or an application specific integrated circuit (ASIC) based on the processing performed by the limited units.

A computer readable storage medium according to an embodiment of the disclosure stores computer programs, the computer programs, when executed by a processor, cause the processor to perform the method for setting a network mode of an electronic terminal as described in the above embodiments. The computer readable storage medium may be any data storage apparatus that may store data read by a computer system. Examples of the computer readable storage medium may include: read only memory, random access memory, read-only optical disk, magnetic tape, floppy disk, optical data storage apparatus, and carrier wave (such as data transmission through the Internet via a wired or wireless transmission path).

An electronic terminal according to an embodiment of the disclosure includes: a processor (not shown) and a memory (not shown), where the memory stores a computer program, the computer program, when executed by the processor, implements the method for setting a network mode of an electronic terminal as described in the above embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a device for setting a network mode of an electronic terminal, the method comprising:

monitoring whether a tracking area where the electronic terminal is located has changed;

in response to detecting that the tracking area has changed, querying standalone mode availability information of the changed-to tracking area from a local list including tracking area code of at least one tracking area and corresponding standalone mode availability information for each of the at least one tracking area;

in case that the standalone mode availability information of the changed-to tracking area is found from the local list, acquiring the standalone mode availability information of the changed-to tracking area from the local list, in case that the standalone mode availability information of the changed-to tracking area is not found from the local list, transmitting a tracking area code of the changed-to tracking area to a server, receiving the standalone mode availability information of the changed-to tracking area from the server, and updating the local list with the tracking area code of the changed-to tracking area and the received standalone mode availability information of the changed-to tracking area; and setting the network mode based on the standalone mode availability information of the changed-to tracking area, wherein the setting of the network mode comprises:

setting the network mode to a standalone priority mode, in case that an standalone mode is available in the changed-to tracking area based on the standalone mode availability information; and setting the network mode to a non-standalone mode, in case that the standalone mode is not available in the changed-to tracking area based on the standalone mode availability information.

2. The method of claim 1, wherein the monitoring of whether the tracking area where the electronic terminal is located has changed comprises:

acquiring the tracking area code of a current tracking area;

determining whether or not the tracking area code of the current tracking area is same as the tracking area code of a tracking area acquired at a previous time; and in case that the tracking area code is not the same, determining that the tracking area where the electronic terminal is located has been changed.

3. The method of claim 2, wherein the acquiring of the tracking area code of a current network area comprises:

acquiring the tracking area code of the current tracking area according to a registered cell; or acquiring the tracking area code of the current tracking area by positioning.

4. The method of claim 1, wherein the setting of the network mode based on the standalone mode availability information of the changed-to tracking area further comprises:

setting the network mode to a standalone (SA) priority mode, when the SA mode is available in the changed-to tracking area, and setting the network mode to a non-standalone (NSA) mode, when the SA mode is not available in the changed-to tracking area.

5. The method of claim 1, further comprising:

deleting all or part of entries in the local list, when a preset condition is met; or acquiring periodically the standalone mode availability information of the at least one tracking area from the server to update the local list.

6. A device for setting a network mode of an electronic terminal, the device comprising:

a memory; and at least one processor configured to:

monitor whether a tracking area where the electronic terminal is located has changed, in response to detecting that the tracking area has changed, query standalone mode availability information of the changed-to tracking area from a local list including tracking area code of at least one tracking area and corresponding standalone mode availability information for each of the at least one tracking area;

in case that the standalone mode availability information of the changed-to tracking area is found from the local list, acquire the standalone mode availability information of the changed-to tracking area from the local list, in case that the standalone mode availability information of the changed-to tracking area is not found from the local list, transmit a tracking area code of the changed-to tracking area to a server, receive the standalone mode availability information of the changed-to tracking area from the server, and update the local list with the tracking area code of the changed-to tracking area and the received standalone mode availability information of the changed-to tracking area; and set network mode based on the standalone mode availability information of the changed-to tracking area, wherein the at least one processor is further configured to:

set the network mode to a standalone priority mode, in case that an standalone mode is available in the changed-to tracking area based on the standalone mode availability information; and set the network mode to a non-standalone mode, in case that the standalone mode is not available in the changed-to tracking area based on the standalone mode availability information.

7. The device of claim 6, wherein the at least one processor is further configured to:

acquire the tracking area code of a current tracking area;

determine whether or not the tracking area code of the current tracking area is same as the tracking area code of a tracking area acquired at a previous time; and in case that the tracking area code is not the same, determine that the tracking area where the electronic terminal is located has been changed.

8. The device of claim 7, wherein the at least one processor is further configured to:

acquire the tracking area code of the current tracking area according to a registered cell; or acquire the tracking area code of the current tracking area by positioning.

9. The device of claim 6, wherein the at least one processor is further configured to:

set the network mode to a standalone (SA) priority mode, when the SA mode is available in the changed-to tracking area, and set the network mode to a non-standalone (NSA) mode, when the SA mode is not available in the changed-to tracking area.

* * * * *